(No Model.)
R. H. DOUGLASS.
WEED CUTTER.
No. 514,312.
Patented Feb. 6, 1894.
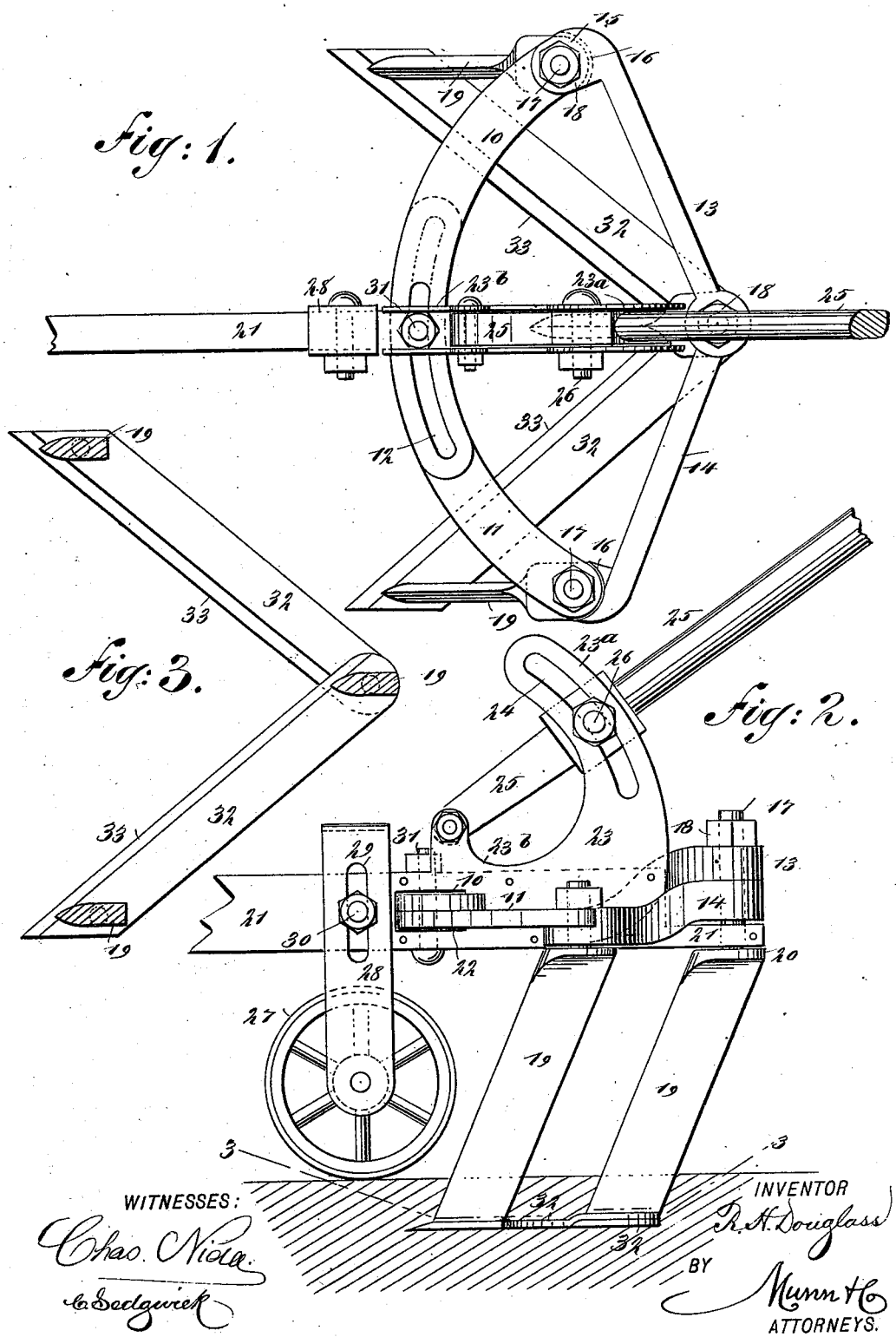
Fig: 1.
Fig: 2.
Fig: 3.
WITNESSES:
Chas. Niola
C. Sedgwick
INVENTOR
R. H. Douglass
BY
Munn & Co
ATTORNEYS.

UNITED STATES PATENT OFFICE.

ROBERT HAYES DOUGLASS, OF COLVILLE, WASHINGTON.

WEED-CUTTER.

SPECIFICATION forming part of Letters Patent No. 514,312, dated February 6, 1894.

Application filed July 18, 1893. Serial No. 480,807. (No model.)

*To all whom it may concern:*

Be it known that I, ROBERT HAYES DOUGLASS, of Colville, in the county of Stevens and State of Washington, have invented a new and Improved Weed-Cutter, of which the following is a full, clear, and exact description.

My invention relates to an improvement in weed cutters, and it has for its object to provide a weed cutter in which the main cutters will be practically of V-shape and so placed that their inner edges will be their cutting edges, the angle of the cutters being at the rear.

A further object of the invention is to provide in conjunction with the main cutters upright cutters, and also to provide a connection between the two sets of cutters, and a means whereby the cutters may be conveniently and expeditiously adjusted to cover more or less ground, or adapt themselves to rows of different widths.

Another feature of the invention consists in providing an adjustable handle for the weed cutter, whereby it may be guided conveniently by persons of large or of small stature.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1 is a plan view of the weed cutter. Fig. 2 is a side elevation thereof; and Fig. 3 is a horizontal section taken practically on the line 3—3 of Fig. 2.

The body of the machine consists of a frame, which frame comprises two segmental front bars 10 and 11, which bars overlap, and are adapted to slide one upon the other, the two bars at their outer ends being provided with registering longitudinal slots 12; and in addition to the front bars 10 and 11, the frame consists of two rear bars 13 and 14, which bars at their inner ends are provided with eyes, and at their outer ends have a disk like formation, or circular extensions 15; in the right-hand bar 13, for example, a recess 16 is formed over its circular extension 15, while a similar recess is formed upon the under face of the extension of the opposite bar. Thus the forward extremities of the back bars are of less thickness than their other portions, and the recessed surface of one bar is uppermost, while that of the opposite bar faces downward.

The recessed surfaces of the rear bars 13 and 14, are adapted for engagement with the rear extremities of the front segmental bars 10 and 11, the right-hand bar 13 being made to run upon the right-hand bar 10, while the left-hand front bar 11 rests upon the corresponding rear bar 14. The front and rear bars are pivotally connected through the medium of threaded pins or bolts 17, provided with suitable lock nuts 18, and the said pins or bolts are firmly secured to or made integral with vertical cutters 19. The cutters are inclined in direction of the front of the machine, and are provided with an enlarged preferably circular head 20, in which the bolts or pins are secured, the heads being adapted for engagement with the under sides of the frame, the left-hand cutter bar engaging with the left-hand rear bar of the frame, while the right-hand cutter bar at its head will engage with the right-hand forward bar of the frame. The cutters are preferably flattened upon their side faces, as shown in Fig. 2, and their lower ends are more or less beveled.

A draft beam 21, is provided in connection with the frame, and is adapted to extend from front to rear of the frame across the central portion thereof. In the forward portion of the draft beam 21 a slot or opening 22, is produced, through which the overlapping ends of the front bars 10 and 11 of the frame are passed, while at the rear end of the draft beam an aperture is produced, and the inner ends of the two rear bars 13 and 14 are carried one upon the other, and both of them fill the apertured portion of the draft beam, and the draft beam and the two rear bars are connected by a third upright cutter 19, of similar construction to the forward cutters, the threaded pin or screw whereof is passed through the aperture of the beam and through the eyes of the said rear bars of the frame, as is best shown in Fig. 2.

A bracket 23, is secured upon the draft beam between the front and rear of the frame, which bracket is provided at its rear portion with upwardly and forwardly curved concentric members 23ª. These members are provided with longitudinal curved slots 24, as is also shown in Fig. 2, and the bracket is further provided near the forward portion of the frame with parallel upright members 23ᵇ. The lower or forward end of a handle 25, is pivoted between the forward members 23ᵇ, and the said handle is passed rearward through the curved members 23ª of the bracket, and the handle may be given more or less of an inclination in order that the machine may be guided by a person of large or of small stature, by passing a set screw 26 through the handle and through the slots 24 of the bracket.

A caster wheel 27, is located at the front of the machine, it being journaled in a pedestal 28, which pedestal is adjustably connected with the draft beam immediately in front of the forward end of the frame, as is likewise best shown in Fig. 2, the adjustment being effected by producing slots 29 in the pedestal and passing a set screw 30 through the slots and through the beam.

It will be observed that the vertical or standing cutters are triangularly arranged, and that the distance between the forward cutters may be increased or decreased by simply loosening the nuts upon the screws 17 of the cutters and sliding the front bars inward, or carrying them outward as may be desired, and when a proper adjustment is obtained, the frame is rigidly held in the desired position by the adjusting or set screw 31, which is passed through the beam and through the slots 12 in the front bars.

In addition to the upright cutters 19, horizontal cutters 32, are employed. These cutters consist preferably of thin metal blades, arranged at right angles to each other, or substantially in the form of a letter V, their inner edges 33, being cutting edges, and said edges are preferably beveled at the top, as is best shown in Fig. 3. The horizontal blades or cutters are adapted to follow the adjustment of the frame and the vertical or upright cutters, and to that end the front upright or vertical cutters are pivotally connected with the forward ends of the horizontal blades, while the rear vertical or upright cutter is pivotally connected with the overlapping ends of both of the horizontal blades. Therefore, instead of the angle of the V-horizontal cutters being in direction of the front it is in the direction of the rear, and the V-cutters, as the machine advances, present their inner edges to the weeds.

It is evident that in adjusting the frame the V-cutters will follow said adjustment, and that therefore they may travel over a greater or less expanse of ground, and may be readily adjusted to any width of row.

The machine is exceedingly simple, it is durable and it is economic, and its adjustment may be expeditiously and conveniently effected.

Having thus described my invention, I claim as new and desire to secure by Letters Patent—

1. In a weed cutter, the combination, with an adjustable frame, and uprights adjustable with the frame, of horizontal cutters comprising blades pivoted at one end and arranged in substantially V-shape, the uprights of the frame being pivotally connected with the connected end of the blades at their outer ends, the connection between the horizontal blades and the uprights being independently effected, whereby when the frame is adjusted the cutters or blades follow the adjustment of the frame, as and for the purpose specified.

2. In a weed cutter, the combination, with a frame, comprising segmental front bars having lateral adjustment one upon the other, and rear bars pivotally connected with each other and with the front bars, of upright cutters pivotally connected with the bars of the frame at the junction of the front and rear bars and at the junction of the rear bars with each other, and horizontal cutters arranged in the shape of a V, the forward upright cutters being pivotally connected with the diverging ends of the horizontal blades or cutters, and a rear upright cutter being pivotally connected with the overlapping ends of the said horizontal blades or cutters, as and for the purpose specified.

3. In a weed cutter, the combination, with a frame comprising a draft bar, front bars of segmental form, the inner ends of which overlap and have sliding and adjustable connection with the draft beam, and rear bars pivotally connected with the rear ends of the segmental front bars and with the rear extremity of the draft beam, of upright cutters pivotally connected with the frame at the junction of the rear and front bars and the junction of the rear bars with the beam, horizontal cutters having one of their ends overlapping and the opposite ends diverging from each other, the upright cutters being pivotally connected with the horizontal cutters, an adjustable caster wheel located upon the beam in front of the frame, and an adjustable handle connected with the beam, as and for the purpose specified.

ROBERT HAYES DOUGLASS.

Witnesses:
C. R. MCMILLEN,
FRANK GOODMAN.